US005433809A

United States Patent [19]

Pies et al.

[11] Patent Number: 5,433,809

[45] Date of Patent: Jul. 18, 1995

[54] METHOD OF MANUFACTURING A HIGH DENSITY INK JET PRINTHEAD

[75] Inventors: John R. Pies; David B. Wallace, both of Dallas; Donald J. Hayes, Plano, all of Tex.

[73] Assignee: Compaq Computer Corporation, Houston, Tex.

[21] Appl. No.: 149,717

[22] Filed: Nov. 9, 1993

Related U.S. Application Data

[63] Continuation of Ser. No. 746,036, Aug. 16, 1991, abandoned.

[51] Int. Cl.[6] .......... B32B 31/18

[52] U.S. Cl. .......... 156/268; 156/257; 29/25.35; 29/890.1; 346/139 R; 347/68; 347/69; 347/71; 347/72

[58] Field of Search .......... 156/268, 257; 346/140 R; 29/25.35, 890.1; 347/68, 69, 70, 71, 72

[56] References Cited

U.S. PATENT DOCUMENTS

| | | | |
|---|---|---|---|
| 3,857,049 | 12/1974 | Zoltan | 310/8.1 |
| 4,194,210 | 3/1980 | Krause | 346/75 |
| 4,536,097 | 8/1985 | Nilsson | 400/126 |
| 4,584,590 | 4/1986 | Fischbeck et al. | 346/140 R |
| 4,751,774 | 6/1988 | DeYoung et al. | 29/25.35 |
| 4,825,227 | 4/1989 | Fischbeck et al. | 346/1.1 |
| 4,879,568 | 11/1989 | Bartky et al. | 346/140 R |
| 4,887,100 | 12/1989 | Michaelis et al. | 346/140 R |
| 4,963,882 | 10/1990 | Hickman | 346/1.1 |
| 5,016,028 | 5/1991 | Temple | 346/140 R |
| 5,072,240 | 12/1991 | Miyazawa et al. | 29/25.35 X |
| 5,193,256 | 3/1993 | Ochiai et al. | 29/25.35 |
| 5,265,315 | 11/1993 | Hoisington et al. | 29/25.35 |

FOREIGN PATENT DOCUMENTS

| | | |
|---|---|---|
| 0364136 | 4/1990 | European Pat. Off. . |
| 0402172 | 12/1990 | European Pat. Off. . |
| 3820082 | 12/1988 | Germany . |

OTHER PUBLICATIONS

Wallace, David B., "A Method of Characteristics Model of a Drop-on-Demand Ink-Jet Device Using an Integral Method Drop Formation Model", 89-WA/-FE-4 (1989).

*Primary Examiner*—David A. Simmons
*Assistant Examiner*—M. Curtis Mayes
*Attorney, Agent, or Firm*—Konneker & Bush

[57] ABSTRACT

Method for manufacturing a sidewall actuatable, high density channel array for an ink jet printhead. A first surface of a main body portion formed from an active material is conductively bonded to a first surface of a first intermediate body portion formed from an active material. A plurality of parallel grooves are then machined through the first intermediate body portion and part of the main body portion to form a plurality of channels separated by a corresponding plurality of sidewall actuators comprised of a first sidewall section formed from an active material and a second sidewall section formed from an active material. A top body portion is then conductively mounted to the intermediate body portion.

12 Claims, 10 Drawing Sheets

METHOD OF MANUFACTURING A HIGH DENSITY INK JET PRINTHEAD

CROSS REFERENCE TO RELATED APPLICATIONS

This is a continuation of application Ser. No. 07/746,036, filed Aug. 16, 1991 abandoned.

This application is related to co-pending U.S. Pat. application Ser. No. 07/746,521 filed on even date herewith, entitled SIDEWALL ACTUATOR FOR A HIGH DENSITY INK JET PRINTHEAD, issued on Jul. 13, 1993 as U.S. Pat. No. 5,227,813 and hereby incorporated by reference as if reproduced in its entirety.

This application is also related to co-pending U.S. Pat. application Ser. No. 07/748,220 also filed on even date herewith, entitled HIGH DENSITY INK JET PRINTHEAD, issued on Aug. 10, 1993 as U.S. Pat. No. 5,235,352 and hereby incorporated by reference as if reproduced in its entirety.

BACKGROUND OF THE INVENTION

1. Field of the Invention

The invention relates to a method for manufacturing an ink jet printhead and, more particularly, to a method for manufacturing a ink jet printhead having a high density parallel channel array and sidewall actuators for ejecting ink from the channels.

2. Description of Related Art

Printers provide a means of outputting a permanent record in human readable form In most cases, a printing technique may be categorized as either an impact printing technique or a non-impact printing technique. In impact printing, an image is formed by striking an inked ribbon placed near the surface of a sheet of paper with an impact element. Impact printing techniques may be further characterized as either formed-character printing or matrix printing. In formed-character printing, the impact element which strikes the ribbon to produce the image consists of a raised mirror image of a desired character. In matrix printing, the impact element is a wire or wires. Here, characters are formed as a series of closely spaced dots produced by striking the provided wire or wires against the ribbon. By selectively striking the provided wires against the ribbon, any character representable by a matrix of dots can be produced.

Non-impact printing is often preferred over impact printing in view of its tendency to provide higher printing speeds as well as its better suitability for printing graphics and half-tone images. Non-impact printing techniques include matrix, electrostatic and electrophotographic type printing techniques. In matrix type printing, wires are selectively heated by electrical pulses and the heat thereby generated causes a mark to appear on a sheet of paper, usually specially treated paper. In electrostatic type printing, an electric arc between the printing element and a sheet of conductive paper removes an opaque coating on the paper to expose a sublayer of a contrasting color. Finally, in electrophotographic type printing, a photoconductive material is selectively charged utilizing a light source such as a laser. A powder toner is attracted to the charged regions and, when placed in contact with a sheet of paper, transfers to the paper's surface. The toner is then subjected to heat which fuses it to the paper.

Another form of non-impact printing is generally classified as ink jet printing. Ink jet printing systems use the ejection of tiny droplets of ink to produce an image. The devices produce highly reproducible and controllable droplets, so that a droplet may be printed at a location specified by digitally stored image data. Most ink jet printing systems commercially available may be generally classified as either a "continuous jet" type ink jet printing system where droplets are continuously ejected from the printhead and either directed to or away from the paper depending on the desired image to be produced or as a "drop on demand" type ink jet printing system where droplets are ejected from the printhead in response to a specific command related to the image to be produced.

Continuous jet type ink jet printing systems are based upon the phenomena of uniform droplet formation from a stream of liquid issuing from an orifice. It had been previously observed that fluid ejected under pressure from an orifice about 50 to 80 microns in diameter tends to break up into uniform droplets upon the simplification of capillary waves induced onto the jet, for example, by an electromechanical device that causes pressure oscillations to propagate through the fluid. For example, in FIG. 3., a schematic illustration of a continuous jet type ink jet printer 200 may now be seem Here, a pump 202 pumps ink from an ink supply 204 to a nozzle assembly 206. The nozzle assembly 206 includes a piezo crystal 208 which is continuously driven by an electrical voltage supplied by a crystal driver 210. The pump 202 forces ink supplied to the nozzle assembly 206 to be ejected through nozzle 212 in a continuous stream The continuously oscillating piezo crystal 208 creates pressure disturbances that cause the continuous stream of ink to break-up into uniform droplets of ink and acquire an electrostatic charge due to the presence of an electrostatic field, often referred to as the charging field, generated by electrodes 214. Using high voltage deflection plates 216, the trajectory of selected ones of the electrostatically charged droplets can be controlled to hit a desired spot on a sheet of paper 218. The high voltage deflection plates 216 also deflect unselected ones of the electrostatically charged droplets away from the sheet of paper 218 and into a reservoir 220 for recycling purposes. Due to the small size of the droplets and the precise trajectory control, the quality of continuous jet type ink jet printing systems can approach that of formed-character impact printing systems. However, one drawback to continuous jet type ink jet printing system is that fluid must be jetting even when little or no printing is required. This requirement degrades the ink and decreases reliability of the printing system.

Due to this drawback, there has been increased interest in the production of droplets by electromechanically induced pressure waves. In this type of system, a volumetric change in the fluid is induced by the application of a voltage pulse to a piezoelectric material which is directly or indirectly coupled to the fluid. This volumetric change causes pressure/velocity transients to occur in the fluid and these are directed so as to produce a droplet that issues from an orifice. Since the voltage is applied only when a droplet is desired, these types of ink jet printing systems are referred to as drop-on-demand. For example, in FIG. 2, a drop on demand type ink jet printer is schematically illustrated. A nozzle assembly 306 draws ink from a reservoir (not shown). A driver 310 receives character data and actuates piezoelectric material 308 in response thereto. For example, if the received character data requires that a droplet of ink is to be ejected from the nozzle assembly 306, the driver 310 will apply a voltage to the piezoelectric material 308. The piezoelectric material will then deform in a manner that will force the nozzle assembly 306 to eject a droplet of ink from orifice 312. The ejected droplet will then strike a sheet of paper 318.

The use of piezoelectric materials in ink jet printers is well known. Most commonly, piezoelectric material is used in a piezoelectric transducer by which electric energy is converted into mechanical energy by applying an electric field across the material, thereby causing the piezoelectric material to deform. This ability to distort piezoelectric material has often been utilized in order to force the ejection of ink from the ink-carrying channels of ink jet printers. One such ink jet printer configuration which utilizes the distortion of a piezoelectric material to eject ink includes a tubular piezoelectric transducer which surrounds an ink-carrying channel. When the transducer is excited by the application of an electrical voltage pulse, the ink-carrying channel is compressed and a drop of ink is ejected from the channel. For example, an ink jet printer which utilizes circular transducers may be seen by reference to U.S. Pat. No. 3,857,049 to Zoltan. However, the relatively complicated arrangement of the piezoelectric transducer and the associated ink-carrying channel causes such devices to be relatively time-consuming and expensive to manufacture.

In order to reduce the per ink-carrying channel (or "jet") manufacturing cost of an ink jet printhead, in particular, those ink jet printheads having a piezoelectric actuator, it has long been desired to produce an ink jet printhead having a channel array in which the individual channels which comprise the array are arranged such that the spacing between adjacent channels is relatively small. For example, it would be very desirable to construct an ink jet printhead having a channel array where adjacent channels are spaced between approximately four and eight mils apart. Such a ink jet printhead is hereby defined as a "high density" ink jet printhead. In addition to a reduction in the per ink-carrying channel manufacturing cost, another advantage which would result from the manufacture of an ink jet printhead with a high channel density would be an increase in printer speed. However, the very close spacing between channels in the proposed high density ink jet printhead has long been a major problem in the manufacture of such printheads.

Many attempts to manufacture ink jet printheads having piezoelectric actuators and reduced spacing between channels have focussed on the manufacture of ink jet printheads with parallel channel arrays and shear mode piezoelectric transducers for actuating the channels. For example, U.S. Pat. Nos. 4,584,590 and 4,825,227, both to Fischbeck et al., disclose shear mode piezoelectric transducers for a parallel channel array ink jet printhead. In both of the Fischbeck et al. patents, a series of open ended parallel ink pressure chambers are covered with a sheet of a piezoelectric material along their roofs. Electrodes are provided on opposite sides of the sheet of piezoelectric material such that positive electrodes are positioned above the vertical walls separating pressure chambers and negative electrodes are positioned over the chamber itself. When an electric field is provided across the electrodes, the piezoelectric material, which is polled in a direction normal to the electric field direction, distorts in a shear mode configuration to compress the ink pressure chamber. In these configurations, however, much of the piezoelectric material is inactive. Furthermore, the extent of deformation of the piezoelectric interest is small.

An ink jet printhead having a parallel channel array and which utilizes piezoelectric materials to construct the sidewalls of the ink-carrying channels may be seen by reference to U.S. Pat. No. 4,536,097 to Nilsson. In Nilsson, an ink jet channel matrix is formed by a series of strips of a piezoelectric material disposed in spaced parallel relationships and covered on opposite sides by first and second plates. One plate is constructed of a conductive material and forms a shared electrode for all of the strips of piezoelectric material. On the other side of the strips, electrical contacts are used to electrically connect channel defining pairs of the strips of piezoelectric material. When a voltage is applied to the two strips of piezoelectric material which define a channel, the strips become narrower and higher such that the enclosed cross-sectional area of the channel is enlarged and ink is drawn into the channel. When the voltage is removed, the strips return to their original shape, thereby reducing channel volume and ejecting ink therefrom.

An ink jet printhead having a parallel ink-carrying channel array and which utilizes piezoelectric material to form a shear mode actuator for the vertical walls of the channel has also been disclosed. For example, U.S. Pat. Nos. 4,879,568 to Bartky et al. and 4,887,100 to Michaelis et al. each disclose an ink jet printhead channel array in which a piezoelectric material is used as the vertical wall along the entire length of each channel forming the array. In these configurations, the vertical channel walls are constructed of two oppositely polled pieces of piezoelectric material mounted next to each other and sandwiched between top and bottom walls to form the ink channels. Once the ink channels are formed, electrodes are then deposited along the entire height of the vertical channel wall. When an electric field normal to the polling direction of the pieces of piezoelectric material is generated between the electrodes, the vertical channel wall distorts to compress the ink jet channel in a shear mode fashion.

The manufacture of ink jet printheads having parallel channel arrays with sidewall actuators such as those disclosed by Bartky et al. and Michaelis et al. would be quite cumbersome in practice. To form such an ink jet printhead, a base wall would first be provided and a layer of piezoelectric material mounted thereon A multiplicity of parallel grooves which extend through the piezoelectric material would then be formed, thereby providing the sidewalls which define the channels of the array. Electrodes would then be mounted on the surfaces of the sidewalls which define the channels so that the electric field required to displace the sidewalls may be applied. Electrical drive circuit means would then be connected and a top wall secured to the piezoelectric sidewalls to close the channels. In particular, mounting electrodes on the surfaces of the sidewalls which define the channels can prove quite difficult in practice, particularly in view of the very small dimensions typically involved. One method to mount electrodes along the surfaces of the sidewalls defining the channels would be to metallize the piezoelectric material along the surfaces, remove the metal from the tops of the walls forming the deep grooves and then making electrical connections to the walls deep within the grooves. It is anticipated that each of these steps would pose significant manufacturing problems. Thus, there has yet to be a relatively simple method of manufacturing an ink jet printhead having a high density channel array and sidewall actuators.

SUMMARY OF THE INVENTION

In one embodiment, the present invention is of a method of manufacturing an ink jet printhead having an array of sidewall actuatable parallel channels. A first surface of a main body portion formed from an inactive material is conductively bonded to a first surface of a first intermediate body portion formed from an active material. A plurality of parallel grooves which extend through the first intermediate body portion, thereby forming a plurality of parallel channels separated by a corresponding plurality of sidewall actuators formed from the active material, are then formed. A first surface of a top body portion formed from an inactive material is then conductively bonded to a second surface of the first intermediate body portion. The conductive bond between the first surface of the first intermediate body portion and the first surface of the main body portion are then electrically connected to a voltage source and the conductive bond between the first surface of the top body portion and the second surface of the first intermediate body portion are electrically connected to ground for each of the plurality of sidewall actuators. In one aspect of this embodiment of the invention, the parallel channels are formed by a machining process and, in additional aspects, the forming and/or machining process may extend downward into the main body channel, thereby forming a plurality of parallel channels which are separated by a corresponding plurality of sidewall actuators having a first section formed from the inactive material and a second section formed from the active material.

In another embodiment, the present invention is of a method for manufacturing a high density parallel channel array for an ink jet printhead. A first surface of a main body portion is conductively bonded to a first surface of an intermediate body portion formed of a piezoelectric material polarized in a first direction such that the direction of polarization is parallel to the first surface of the main body portion. A plurality of parallel grooves extending through the intermediate body portion and the main body portion are then formed in a second direction perpendicular to the first direction. Finally, a first surface of a top body portion is then conductively mounted to a second surface of the intermediate body portion.

In yet another embodiment, the present invention is of a method for manufacturing an ink jet printhead having an array of parallel channels, each of which is acuatable by a generally U-shaped sidewall actuator. First surfaces of main and intermediate body portions, each of which is formed from an active material, are conductively mounted to each other. A plurality of parallel channels which extend through the intermediate body portion and part of the main body portion are formed such that each of the parallel channels has first and second sidewalls which include sections of the intermediate and main body portions. A first surface of a top body portion formed from an inactive material is then conductively bonded to the second surface of the intermediate body portion. The conductive bonds between the intermediate and main body portions for the first sidewalls are then electrically connected to a voltage source having a first polarity and the conductive bends between the intermediate and main body portions for the second sidewalls are electrically connected to a voltage source having a second polarity. The conductive bond between the top and intermediate body portions are then connected to ground.

In still yet another embodiment, the present invention is of a method for manufacturing an ink jet printhead having an array of sidewall actuatable parallel channels. First surfaces of main and intermediate body portions formed from an active material are conductively bonded together. A plurality of parallel channels which extend through the intermediate body portion and part of the main body portion, each of which is actuatable a generally U-shaped sidewall actuator are then formed.

BRIEF DESCRIPTION OF THE DRAWING

The present invention may be better understood, and its numerous objects, features and advantages will become apparent to those skilled in the art by reference to the accompanying drawing, in which.

DETAILED DESCRIPTION OF A PREFERRED EMBODIMENT

While the numbering of elements in the following description may appear to be in an somewhat unusual sequence, the sequence has been selected to provide, wherever possible, commonality in numbering between this application and the co-pending applications previously incorporated by reference.

Figure 1:
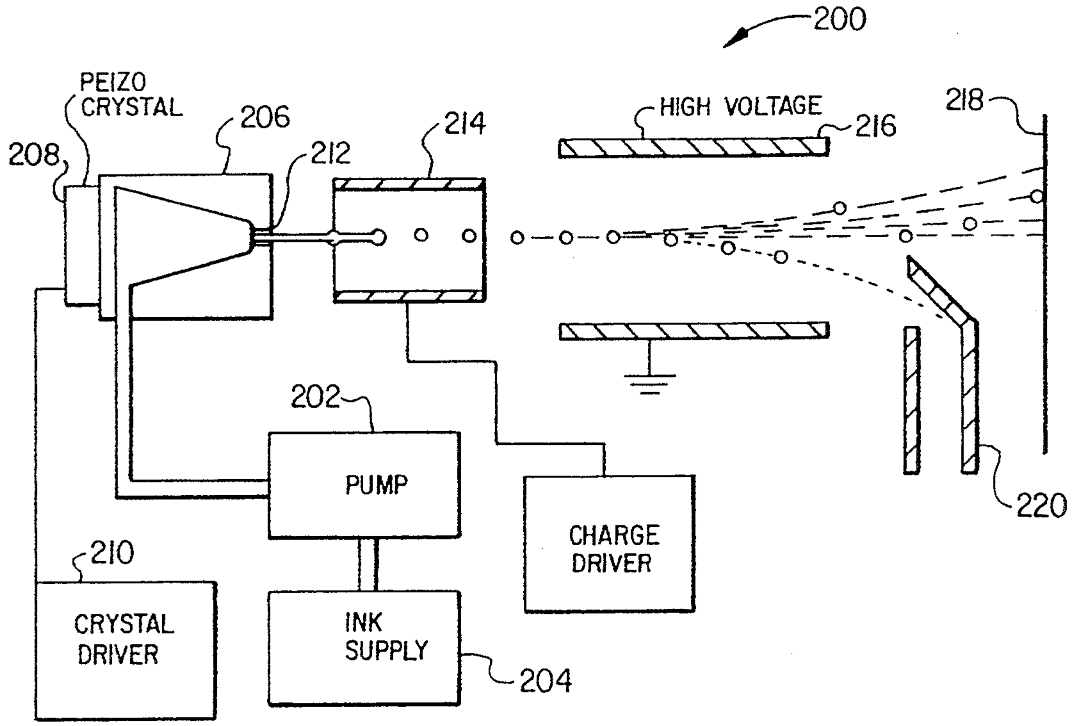
FIG. 1 is a schematic illustration of a continuous jet type ink jet printhead.
Figure 2:
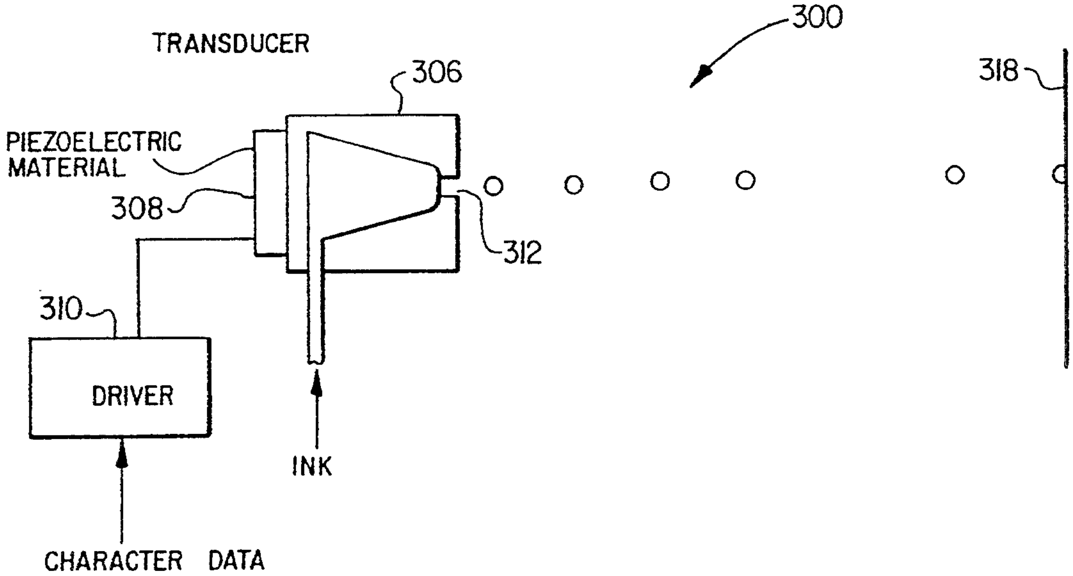
FIG. 2 is a schematic illustration of a drop on demand type ink jet printhead.
Figure 3:
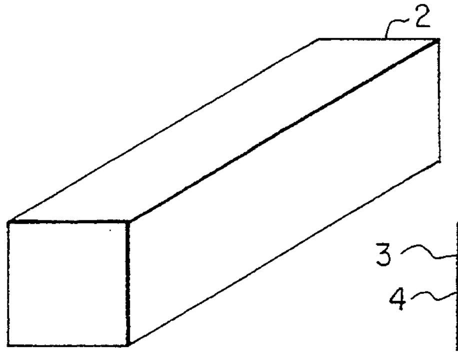
FIG. 3 is a perspective view of a rectangular block of unpolarized piezoelectric material for use in manufacturing a high density, sidewall actuated, parallel channel ink jet printhead constructed in accordance with the teachings of the present invention.

Referring now to the drawing where thicknesses and other dimensions have been exaggerated in various figures as deemed necessary for explanatory or illustrative purposes and where like reference numerals designate the same or similar elements throughout the several figures, in FIG. 3, a rectangular block 2 of piezoelectric material may now be seen. In most cases, piezoelectric material is provided in powder form and must be pressed into a generally rectangular shape such as that illustrated here. Once pressed into a generally rectangular shape, the piezoelectric material is then fired and the surfaces smoothed by grinding to produce the generally rectangular block 2 of piezoelectric material having desired length, width and height dimensions. The exact length, width and height of the generally rectangular block 2 will vary depending upon the size of the high density parallel channel array for an ink jet printhead to be manufactured. In the preferred embodiment of the invention, the piezoelectric material is selected to be lead zirconate titante (or "PZT"). It should be clearly understood, however, that other comparable piezoelectric materials could be used to manufacture the channel array for the ink jet printhead without departing from the scope of the invention.

Figure 4:
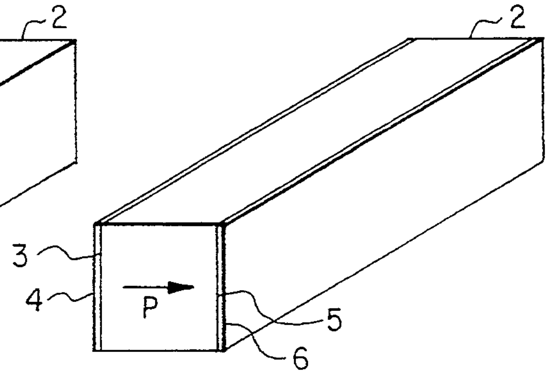
FIG. 4 is a perspective view of the block of piezoelectric material of FIG. 1 after first surface pair metallizing and block polarizing steps.

Referring next to FIG. 4, the rectangular block 2 illustrated in FIG. 3 after polarization in a selected direction "P" may now be seen. To polarize the rectangular block 2, opposing surfaces 3, 5 of the rectangular block 2 are first metallized by applying, for example, by a deposition process, restrictive layers 4, 6 of a conductive metallic material thereon. Next, a high voltage of a predetermined value would be applied between the metallic layers 4 and 6 to polarize the rectangular block 2. The direction of polarization thus created for the rectangular block 2 is illustrated by arrow "P" and corresponds to the direction of the voltage drop between layers 4 and 6. For example, to polarize rectangular block 2 in the illustrated direction, a positive voltage with respect to the layer 6 would be applied to the layer 4. After polarization is complete, metallic layers 4 and 6 are then removed by conventional means.

Figure 5:
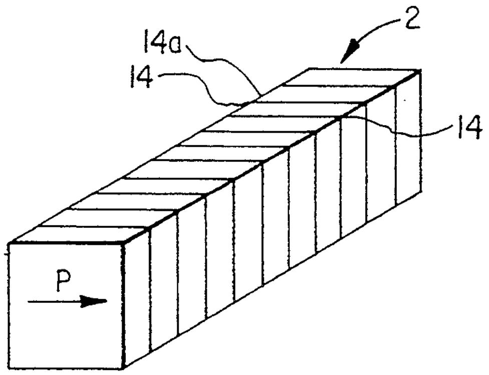
FIG. 5 is a perspective view of the metallized and polarized block of piezoelectric material of FIG. 2 after demetallizing and slicing steps.
Figure 6:
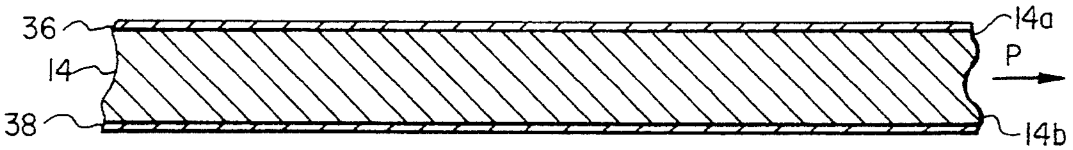
FIG. 6 is a partial front end elevational view of a single sheet of the polarized piezoelectric material of FIG. 3 after a second surface pair metallizing step.

Referring next to FIG. 5, the polarized rectangular block 2 of PZT may now be seen after being machined into a plurality of thin sheets 14, each of a predetermined thickness, for example, by a sawing process. The individual thin sheets 14 are then lapped and the larger opposing surfaces 14*a* and 14*b* would be metallized to provide a first metallized conductive surface 36 and a second metallized conductive surface 38. In the preferred embodiment, the metallization process would be accomplished by depositing a layer of a nichrome-gold alloy on each of the surfaces 14*a* and 14*b.* It should be clearly understood, however, that the aforementioned deposition process is but one manner in which a layer of conductive material may be applied to the surfaces 14*a,* 14*b* and that numerous other conductive materials would be suitable for use as the metallized conductive surface. Referring next to FIG. 6, an individual thin sheet 14, which shall hereafter be referred to as an intermediate body portion 14 for the ink jet printhead 10, having first and second metallized conductive surfaces 36 and 38 may be seen.

Figure 7:
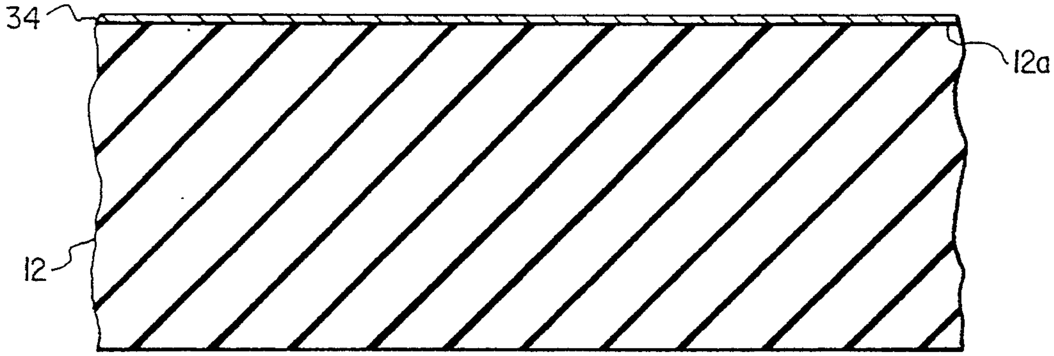
FIG. 7 is a partial front end elevational view of a second block of unpolarized piezoelectric material such as that illustrated in FIG. 3 after a single surface metallizing step.

Referring next to FIG. 7, a main body portion 12 of the high density ink jet printhead 10 may now be seen. In the preferred embodiment of the invention, the main body portion 12 is formed from an unpolarized piezoelectric material. It is fully contemplated, however, that the main body portion 12 need not be formed from a piezoelectric material and may be formed from any inactive material. The main body portion 12 is formed from a piezoelectric material using a process similar to that used to form the intermediate body portion 14 except that, after a second block of piezoelectric material is formed from powdered piezoelectric material, the second block is not polarized and, after, a slice is lapped from the second block to form the main body portion 12, only one of the larger surfaces 12*a* is metallized to provide a third metallized conductive surface 34.

Figure 8:
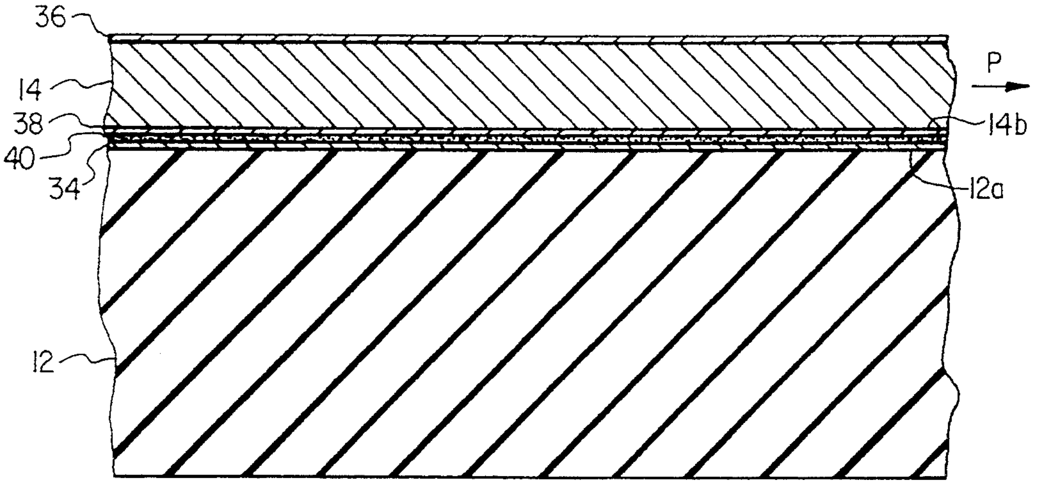
FIG. 8 is a partial front end elevational view of the unpolarized and metallized block of piezoelectric material of FIG. 7 and the polarized and metallized block of piezoelectric material of FIG. 6 after mating and bonding.

Referring next to FIG. 8, the intermediate body portion 14 of FIG. 6 mated and bonded to the main body portion 12 of FIG. 7 may now be seen. Preferably, bending between the intermediate body portion 14 and the main body portion 12 would be achieved by use of a first layer of conductive adhesive 40 such as epoxy or other suitable conductive adhesive to conductively mount the metallized conductive surface 34 of the main body portion 12 and the metallized conductive surface 38 of the intermediate body portion 14. Typically, the first layer of conductive adhesive 40 would be kept very thin, most likely on the order of about two tenths to one-half of a mil in thickness. Alternately, bending between the metallized conductive surface 34 of the main body portion 12 and the metallized conductive surface 38 of the intermediate body portion 14 may be achieved by soldering the metallized conductive surfaces 34, 38 to each other. Preferably, the intermediate body portion 14 should be conductively mounted to the main body portion 12 such that the poling direction P of the intermediate body portion 14 is generally parallel to the surface 12a of the main body portion 12.

It is contemplated that, in accordance with one embodiment of the invention, one or both of the metallized conductive surfaces 34 and/or 38 may be eliminated while maintaining satisfactory operation of the high density ink jet printhead 10 so long as the surface 14*b* of the intermediate body portion 14 and the surface 12*a* of the main body portion 12 are conductively mounted together and a voltage may be readily applied to the first layer of conductive adhesive 40 provided therebetween. Thus, in this specific embodiment of the invention, it is contemplated that a single layer of conductive adhesive 40 is utilized to conductively mount the surfaces 12*a* and 14*b* to each other. It should be noted, however, that the use of solder would not be available for use when the metallized conductive surfaces 34, 38 have been eliminated.

Figure 9:
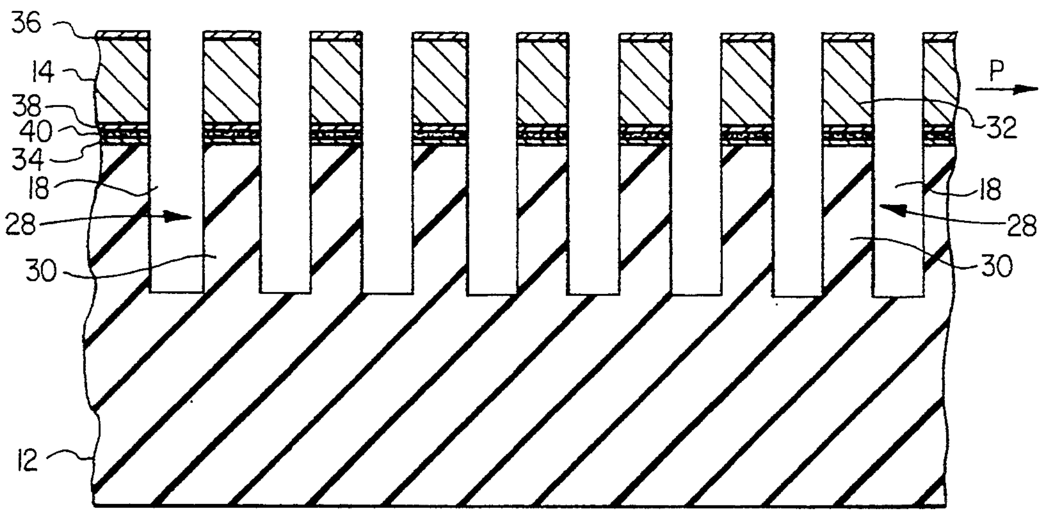
FIG. 9 is a partial front end elevational view of the block of piezoelectric material of FIG. 8 after a machining step.

After a sufficient length of time to allow the layer of conductive adhesive 40 to cure, a machining process is then commenced to form a channel array for the ink jet printhead. As may be seen in FIG. 9, a series of axially extending, substantially parallel channels 18 are formed by machining grooves which extend through the intermediate body portion 14 and the main body portion 12. Preferably, the machining process should be performed such that each channel 18 formed thereby should extend downwardly such that the metallized conductive surface 36, the intermediate body portion 14, the metallized conductive surface 38, the first layer of conductive adhesive 40, the metallized conductive surface 34 and a portion of the main body portion 12 are removed. It is also preferred that the channels 18 are formed such that they axially extend in a direction generally perpendicular to the poling direction P of the intermediate body portion 14. Furthermore, as various aspects of the invention may be practiced by either not extending the machining process into the main body portion 12 or by varying the extent to which the machining process extends into the main body portion, it is contemplated that the ratio of the height of the portion of the main body portion 12 removed with respect to the height of the intermediate body portion 14 may vary dramatically, depending on the particular aspect of the invention to be practiced. For example, it is contemplated that, in various aspects of the invention, the aforementioned ratio of the height of the portion of the main body portion 12 removed by the machining process to the height of the intermediate portion 14 machined through may extend to infinity, i.e. where the portion of the main body portion 12 removed approaches an infinitely small height. It should be noted, however, that by forming the substantially parallel channels 18 such that the height of the section of the main body portion 12 removed by the machining process corresponds to approximately 1.3 times the height of the section of the intermediate body portion 14 removed has been proven suitable in use.

Figure 10:
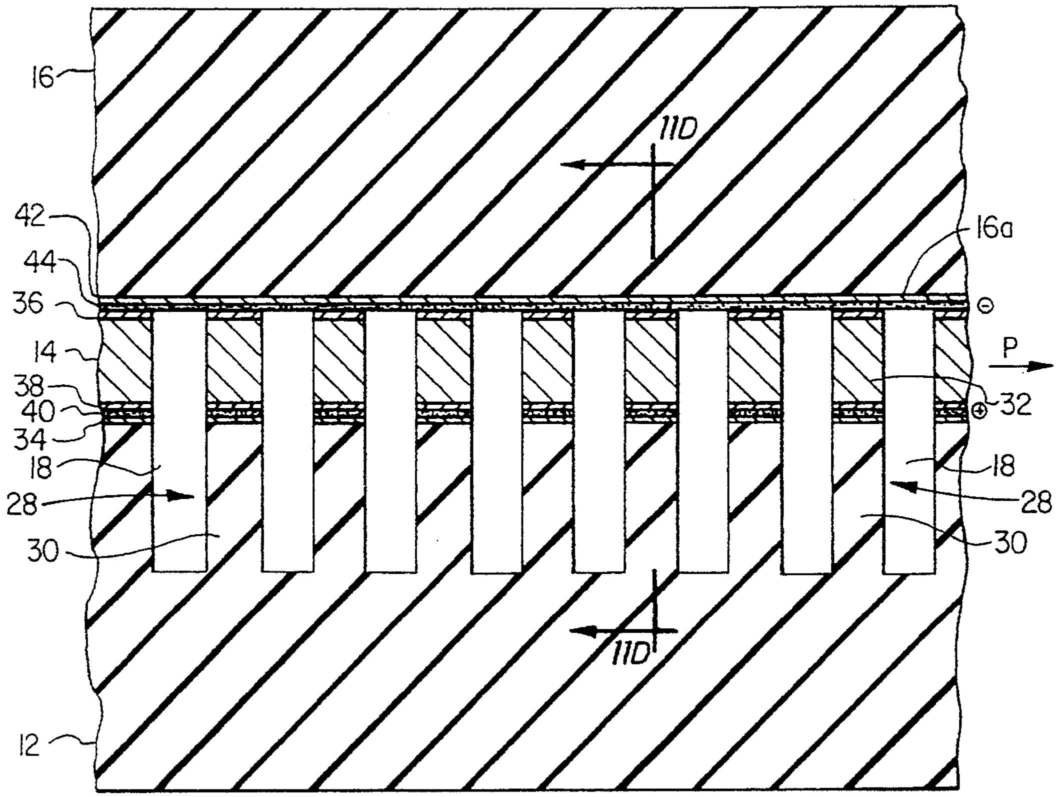
FIG. 10 is a partial front end elevational view of a fully assembled high density parallel channel array for an ink jet printhead constructed by mating a second block of unpolarized, metallized piezoelectric material such as that illustrated in FIG. 7 to the machined block of piezoelectric material illustrated in FIG. 9.

In this manner, the channels 18 which comprise the channel array for the ink jet printhead 10 and sidewall actuators 28, each having a first sidewall actuator section 30 and a second sidewall actuator section 32, which define the sides of the channels 18 and which also produce ink ejecting pressure pulses in the channels 18 adjacent thereto are formed. Referring next to FIG. 10, the, now fully assembled, channel array for the ink jet printhead 10 may be seen. The channel array for the ink jet printhead 10 is formed by conductively mounting a third block 16 of unpolarized piezoelectric material having a single layer of metallized conductive surface 42 formed thereon to the metallized conductive surface 36 of the intermediate body portion 14. The third block 16, which hereafter shall be referred to as the top body portion 16 of the ink jet printhead 10, may be constructed in a manner similar to that previously described with respect to the main body portion 12. To form the top body portion 16, a generally rectangular block of piezoelectric material is formed from powdered piezoelectric material. A metallized conductive surface 42 is then formed on surface 16*a* of the top body portion 16, preferably by a deposition process. Again, while it is preferred that the top body portion 16 is formed from an unpolarized piezoelectric material, it is fully contemplated that the top body portion 16 need not be formed from a piezoelectric material and may be formed from any suitable inactive material.

To complete assembly of the channel array for the ink jet printhead 10, the metallized conductive surface 42 of the top body portion 16 is conductively mounted to the metallized conductive surface 36 of the second sidewall section 32 by a second layer of conductive adhesive 44. Preferably, the layer of conductive adhesive 44 should be spread over the metallized conductive surface 42 and the top body portion 16 then be placed onto the metallized conductive surface 36. As before, it is contemplated that, in one embodiment of the invention, either one or both of the metallized conductive surfaces 36 or 42 may be eliminated while maintaining satisfactory operation of the high density ink jet printhead 10 so long as the surface 14*a* of the intermediate body portion 14 and the surface 16*a* of the top body portion 16 are conductively mounted together and that the second layer of conductive adhesive 44 provided therebetween may be readily connected to ground. Thus, in this specific embodiment of the invention, it is contemplated that the second layer of conductive adhesive 44 may be utilized alone to conductively mount the surfaces 14*a* and 16*a* to each other. As may now be seen, the plurality of vertical grooves of predetermined width and depth previously formed through the intermediate body portion 14 and the main body portion 12 and the surface 16*a* of the top body portion 16 define a plurality of ink-carrying channels 18, thereby providing the channel array for the ink jet printhead 10.

Referring next to FIGS. 11*a–d*, a fully assembled ink jet printhead 10 constructed in accordance with the teachings of the present invention may now be seen. The ink jet printhead 10 includes the main body portion 12 aligned, mated and bonded to the intermediate body portion 14 which, in turn, is aligned, mated and bonded to the top body portion 16. In the embodiment illustrated herein, the surface 12*a* of the main body portion 12 and the surface 14*b* of the intermediate body portion 14 are conductively mounted to each other solely by the first layer of conductive adhesive 40 and the surface 14*a* of the intermediate body portion 14 and the surface 16*a* of the top body portion are conductively mounted to each other solely by the second layer of conductive adhesive 44.

A manifold 22 in communication with the ink-carrying channels 18 is formed near the rear portion of the ink jet printhead 10. Preferably, the manifold is comprised of a channel formed in the top body portion 16 and which extends generally perpendicular to the ink-carrying channels 18 formed in the main and intermediate body portions 12, 14. In a manner more fully described in the co-pending applications previously incorporated by reference, the manifold communicates via an internal conduit 24 extending vertically through the top body portion 16 and an external ink conduit 46 to provide means for supplying ink to the ink-carrying channels 18 from a source of ink 25 connected to the external conduit 46. While the channels 18 extend across the entire length of the ink jet printhead 10, a block 48 of a composite material blocks the back end of the channels 18 so that ink supplied to the channels 18 shall, upon actuation of the channel 18, be propagated in the forward direction where it exits the ink jet printhead 10 through the corresponding one of the tapered orifices 26.

Continuing to refer to FIGS. 11*a–d,* the ink jet printhead 10 further includes a front wall 20 having a front side 20*a*, a back side 20*b* and a plurality of generally tapered orifices 26 extending therethrough. The back side 20*b* is aligned, mated and bonded with the main, intermediate and top body portions 12, 14 and 16, respectively, such that each orifice 26 is in communication with a corresponding one of the plurality of channels 18 formed in the intermediate body portion 14. Preferably, each orifice 26 should be positioned such that it is located at the center of the end of the corresponding channel 18, thereby providing ink ejection nozzles for the channels 18. It is contemplated, however, that the ends of each of the channels 18 could function as orifices for the ejection of drops of ink in the printing process without the necessity of providing the front wall 20 and the orifice 26. It is further contemplated that the dimensions of the orifice array 27 comprised of the orifices 26 could be varied to cover various selected lengths along the front wall 20 depending on the channel requirements of the particular ink jet printhead 10 envisioned. Preferably, the orifice array 27 should be comprised of two, three or more rows of orifices separated by a small distance. Further details regarding the array configuration may be seen by reference to the co-pending patent applications previously incorporated by reference.

Figure 11A:
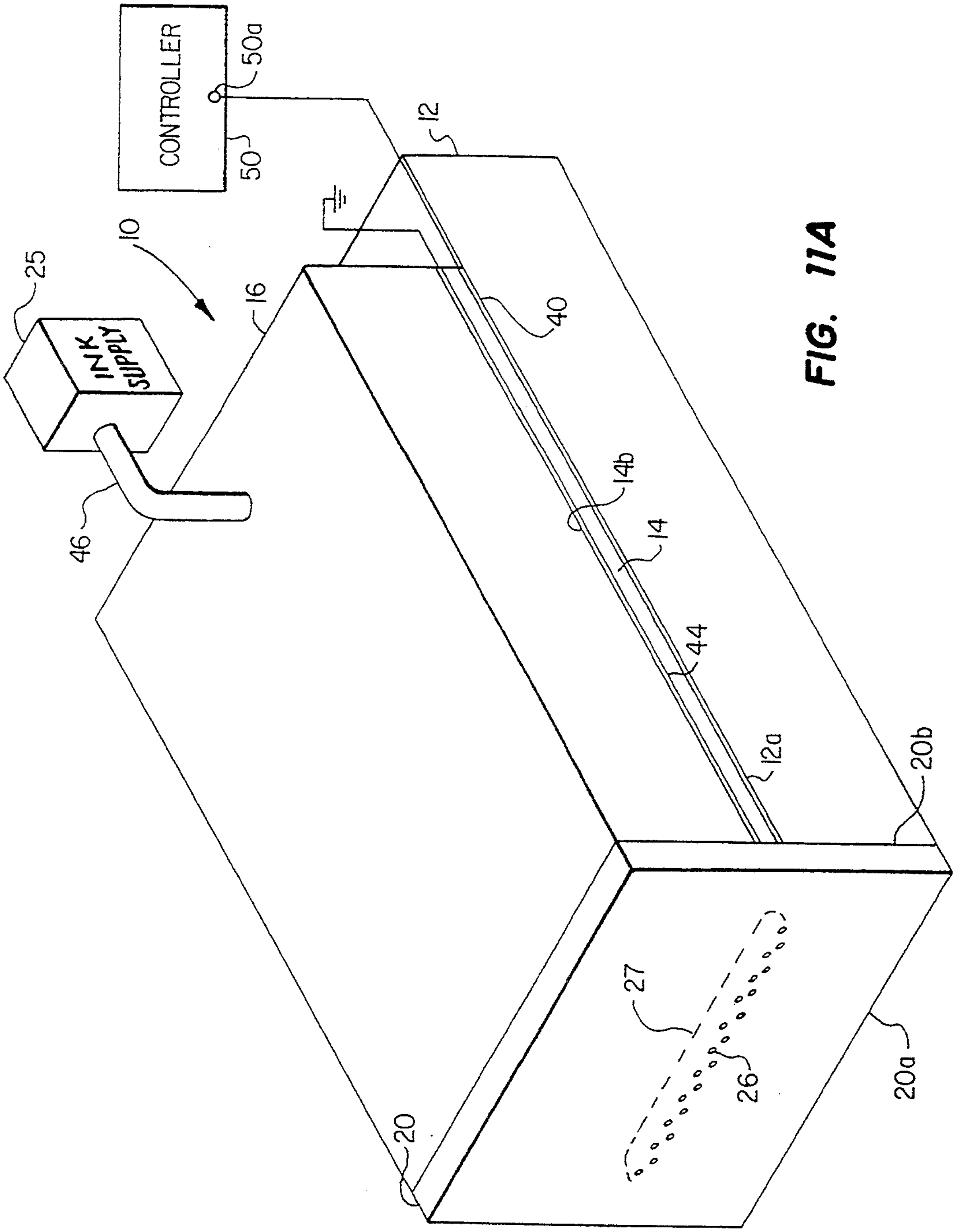
FIG. 11*a* is a perspective view of a fully assembled high density ink jet printhead constructed using the fully assembled high density parallel channel array of FIG. 10.
Figure 11B:
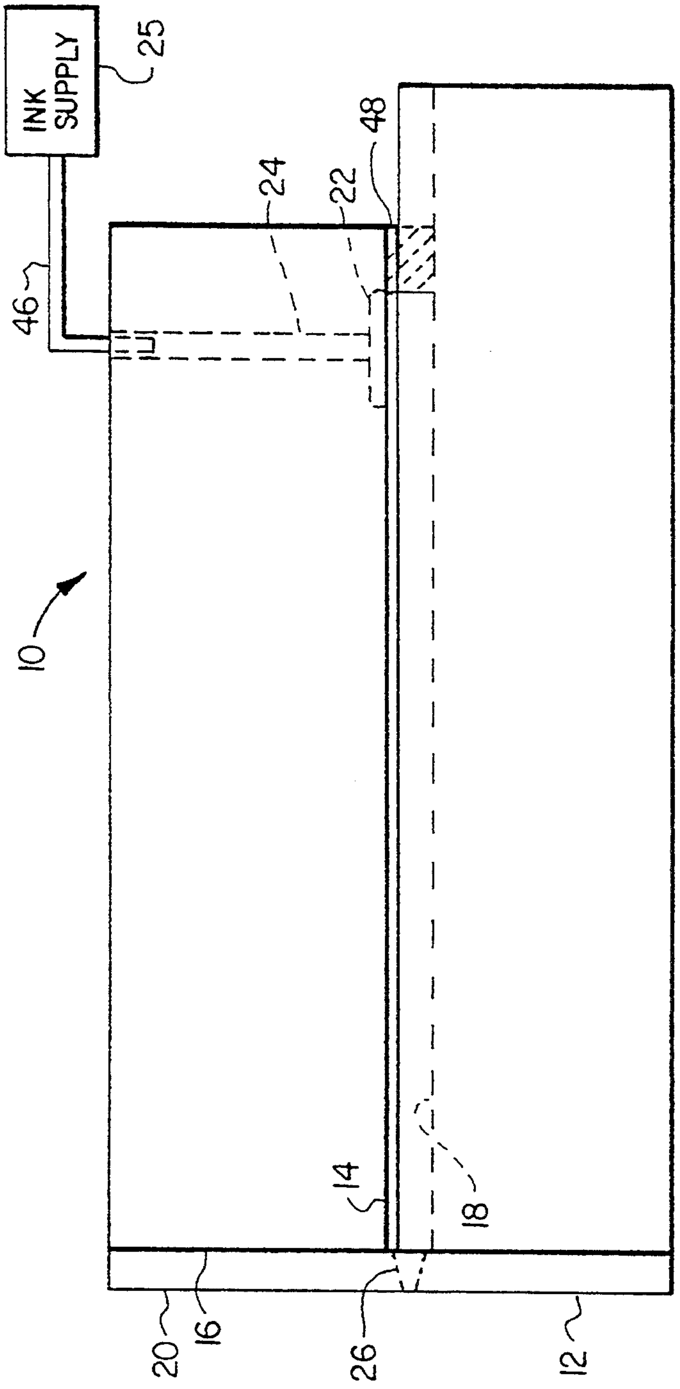
FIG. 11*b* is a side elevational view of the fully assembled high density ink jet printhead of FIG. 11*a;*
Figure 11C:
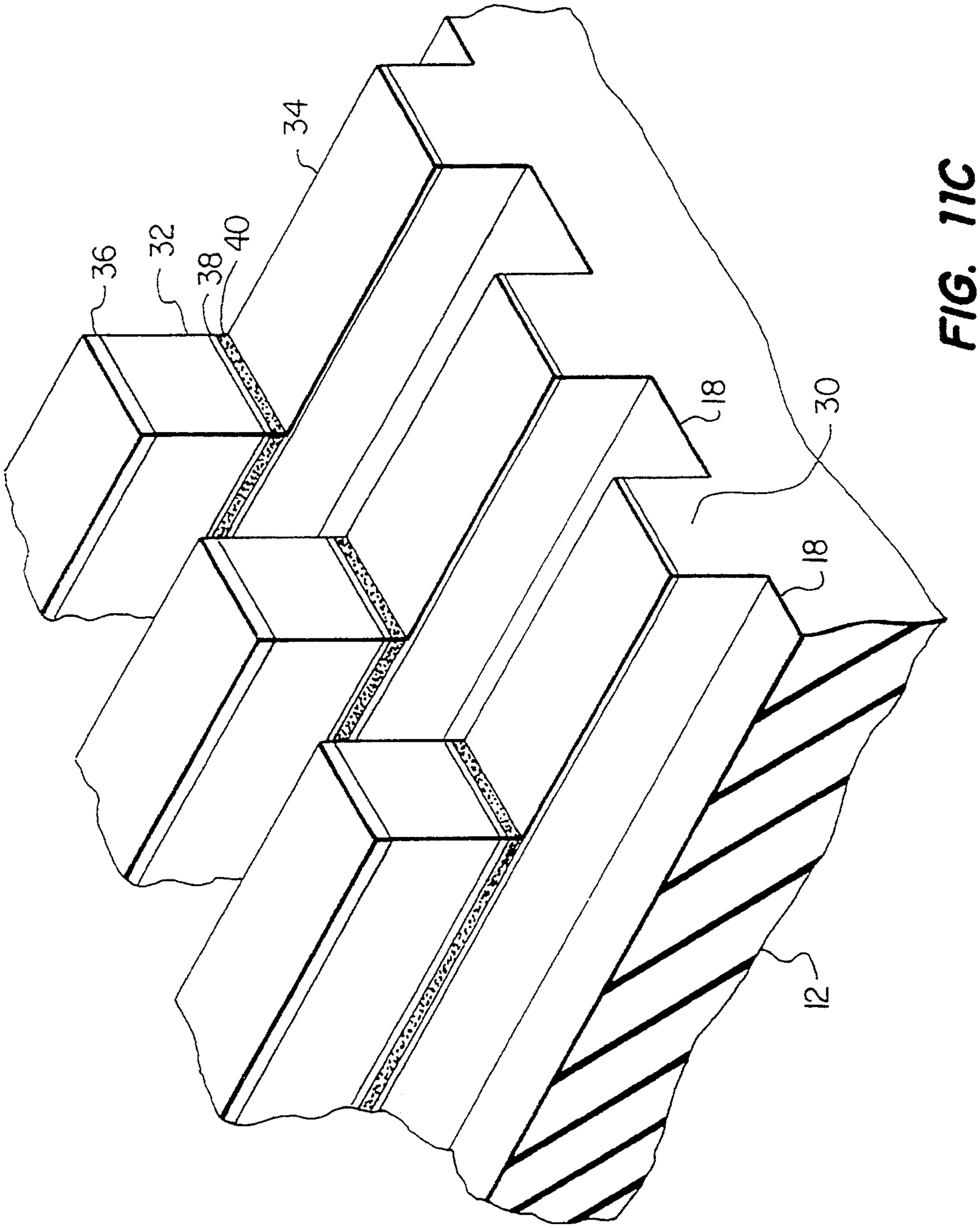
FIG. 11*c* is an enlarged partial cross-sectional view of the rear portion of the ink jet printhead of FIGS. 11*a–b* with the top body portion removed.
Figure 11D:
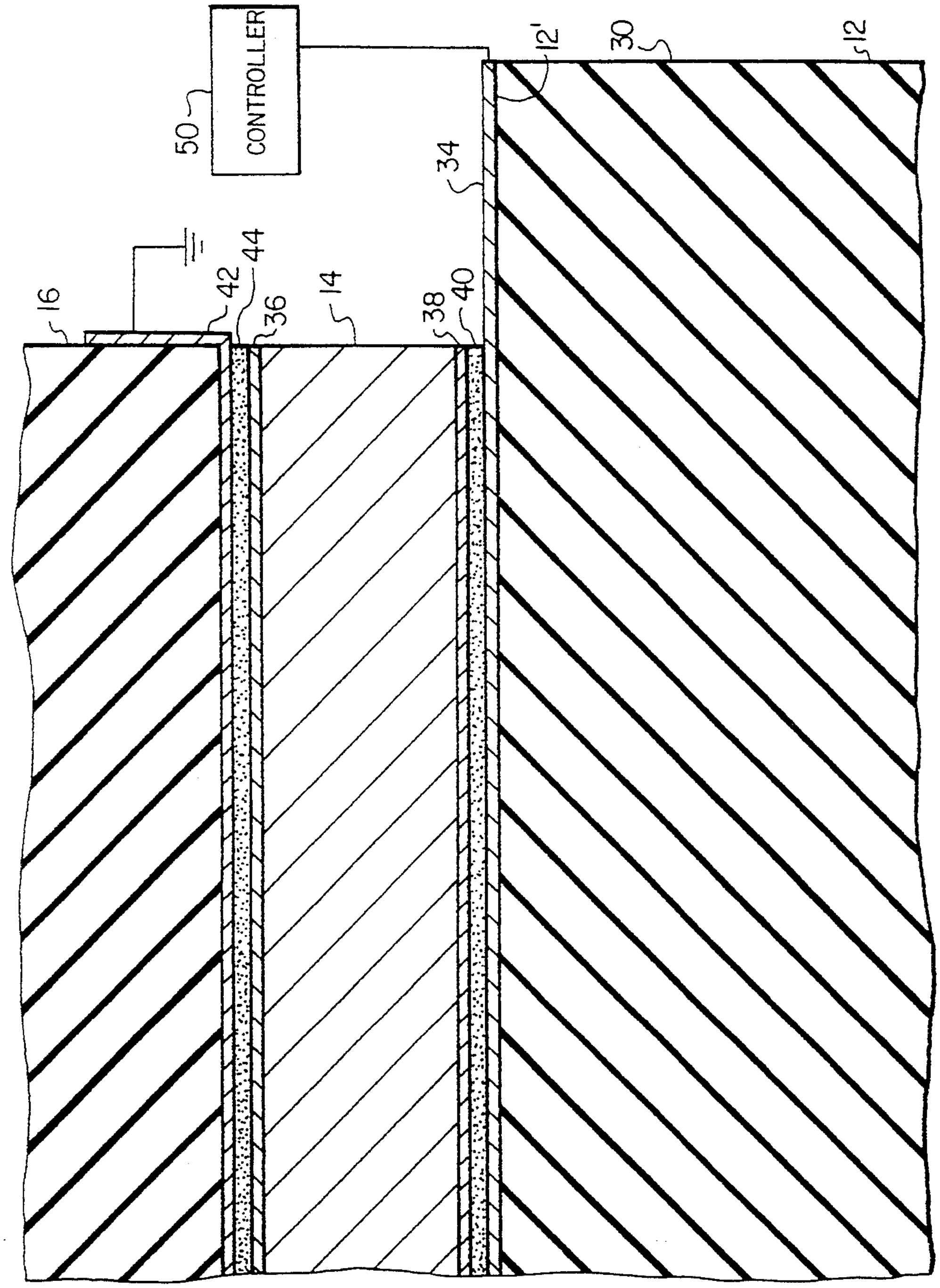
FIG. 11*d* is an enlarged partial cross-sectional view of a rear portion of the ink jet printhead of FIGS. 10 and 11*a–b* taken along lines 11*d*—11*d;*

To actuate the ink jet printhead 10, controller means 50, which typically includes a voltage source and a microprocessor for activating the voltage source in any one of a plurality of predetermined sequences which correspond to the various images to be formed by the ejection of ink by the ink jet printhead, has a voltage terminal 50*a* electrically connected to the first layer of conductive adhesive material 40 corresponding to the various sidewall actuators 28 formed by the machining process. One manner of electrically connecting the controller 50 with the first layer of conductive material 40 for each sidewall actuator 28 is illustrated in FIG. 11*d*. As may now be seen, the controller 50 is electrically connected with the conductive surface 34 formed on the top side surface 12′ of the main body portion 12. On the other hand, the second layer of conductive material 44 for each of the sidewall actuators 28 formed by the machining process is connected to ground. By applying positive and/or negative voltages to the conductive layer 40 corresponding to various ones of the sidewall actuators 28, the channels 18 will deform (or "fire") in a predetermined sequence, thereby causing the ejection of ink from the orifices 26 and forming an image on a sheet of paper (not shown) positioned a short distance from the ink jet printhead 10.

The exact configuration of a pulse sequence for selectively firing the channels 18 may be varied without departing from the teachings of the present invention. For example, a suitable pulse sequence may be seen by reference to the article to Wallace, David B., entitled "A Method of Characteristic Model of a Drop-on-Demand Ink-Jet Device Using an Integral Method Drop Formation Model", 89-WA/FE-4 (1989). In its most general sense, the pulse sequence for a sidewall actuator 28 consists of a positive (or "+") segment which imparts a pressure pulse into the channel 18 being fired by that sidewall actuator 28 and a negative (or "−") segment which imparts a complementary, additive pressure pulse into the channel 18 adjacent to the channel 18 being fired which shares the common sidewall 28 being actuated. For example, in one embodiment of the invention, each sidewall actuator 28 of the pair of adjacent sidewall actuators 28 which define a channel 18 has a pulse sequence which includes the aforementioned positive and negative voltage segments, but for which the positive and negative voltage segments are applied during opposing time intervals for respective ones of the pair, thereby forming a +, −, +, − voltage pattern which would cause every other channel 18 to eject a droplet of ink after the application of voltage. In a second embodiment of the invention, a first pair of adjacent sidewall actuators 28 which define a first channel may have a pulse sequence which includes the aforementioned positive and negative voltage segments applied during opposing time intervals for respective ones of the first pair, and a second pair of adjacent sidewall actuators 28 which define a second channel adjacent to the first channel may have no voltage applied thereto during these time intervals, thereby forming a +, −, 0, 0 voltage pattern in which every fourth channel 18 would fire after the application of voltage. As may be further seen, multiple patterns of channel actuations too numerous to mention may be provided by the selective application of voltages to the first layer of conductive adhesive 40 corresponding to each sidewall actuator 28.

In the embodiment illustrated in FIG. 11, the main body portion 12 extends rearwardly past the intermediate body portion 14 and the top body portion 16, thereby providing a surface on the ink jet printhead 10 on which the controller 50 may be mounted. It is fully contemplated, however, that the main body portion 12, the intermediate body portion 14 and the top body portion 16 may all be of the same length, thereby requiring that the controller 50 be remotely positioned with respect to the ink jet printhead 10.

Referring next to FIGS. 12*a–e,* first, second, third, fourth and fifth embodiments of the sidewall actuator 28 which may be constructed in accordance with the teachings of the present invention may now be seem It is to be clearly understood, however, that while each embodiment of the sidewall actuator 28 disclosed herein require a distinct method of manufacture, each method is encompassed by the broad inventive concept subject of the present application by which a main body portion 12 of an ink jet printhead 10 has a section or sections of an active piezoelectric material, each preferably polarized in a direction parallel to the main body portion 12 and with or without metallized layers deposited along the top and bottom surfaces thereof, are conductively mounted on top of each other to form an intermediate body portion of the ink jet printhead 10. Once the desired number of sections are conductively mounted on top of each other, axially extending grooves are machined through the sections to form a channel array.

The grooves formed thereby extend downward through the conductively mounted layers of piezoelectric material comprising the intermediate body portion 14 and may also partially extend through the underlying inactive material comprising the main body portion 12. Once drilled, the conductive adhesive used to adhesively mount the sections of active piezoelectric material to provide readily connectable electrical contacts for the sidewall actuators formed by the machining process. Electrical connection for the channel extensive sidewall actuators may then be provided at the back side of the ink jet printhead 10.

Figures 12A, 12B, 12C, 12D, 12E:
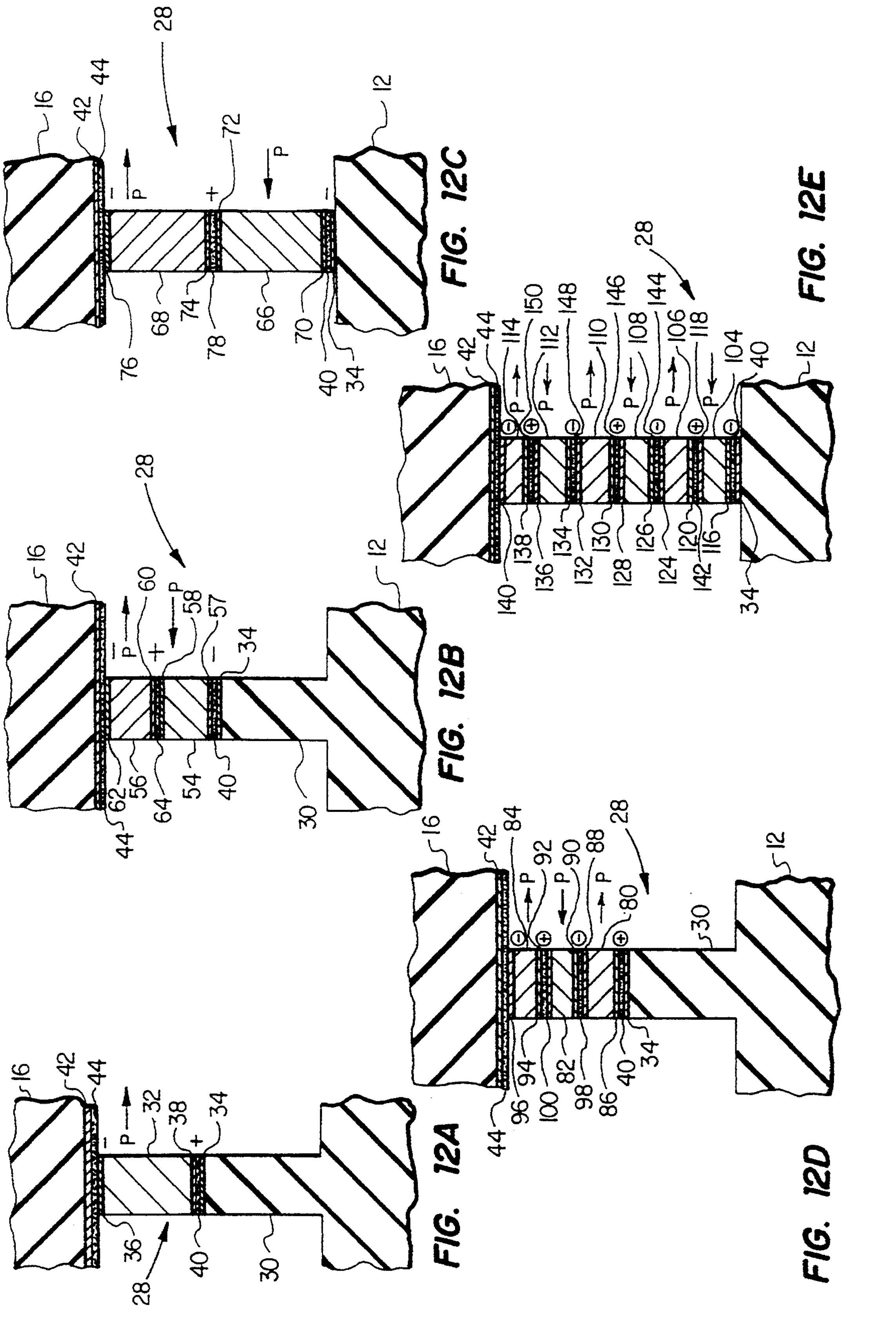
FIG. 12*a* is a partial front end elevational view of a single sidewall actuator for the fully assembled high density parallel channel array of FIG. 10.
FIG. 12*b* is a partial front end elevational view of an alternate embodiment of the single sidewall actuator illustrated in FIG. 12*a;*
FIG. 12*c* is a partial front end elevational view of another alternate embodiment of the single sidewall actuator illustrated in FIG. 12*a;*
FIG. 12*d* is a partial front end elevational view of yet another alternate embodiment of the single sidewall actuator illustrated in FIG. 12*a;*
FIG. 12*e* is a partial front end elevational view of still yet another alternate embodiment of the single sidewall actuator illustrated in FIG. 12*a;*

Referring now to FIG. 12*a*, it is not believed that a full description of the embodiment of the invention is needed as it is identical to that illustrated in FIG. 10. However, certain details related to this embodiment are discussed below to aid in the comparison of this embodiment of this invention with the alternate embodiments of the invention illustrated in FIGS. 12*b–e*. The first embodiment of the sidewall actuator 28 illustrated in FIG. 12*a* is formed by conductively mounting a first layer of piezoelectric material polarized in the indicated direction P such as the intermediate body portion 14 onto the main body portion 12. After the machining process is completed, a series of sidewall actuators 28, one of which is illustrated in FIG. 12, are formed. Each of the sidewall actuators include a first sidewall section 30 formed of an inactive material and a second sidewall section 32 formed of the polarized piezoelectric material. The first layer of conductive adhesive 40 for each of the sidewall actuators 28 formed by the machining process is then connected to the voltage terminal 52 and the second layer of conductive adhesive 42 for each of the sidewall actuator 28 formed by the machining process is connected to ground.

Referring next to FIG. 12*b*, a second embodiment of the sidewall actuator 28 having first, second, and third sidewall sections 30, 54 and 56 may now be seen. Here, second and third sidewall sections 54, 56 are provided with first and second metallized conductive surfaces 57 and 58, 60 and 62, respectively. The first metallized conductive surface 57 of the second sidewall section 54 is mounted to the metallized conductive surface 34 of the first sidewall section 30 by the first layer of conductive adhesive 40 and the second metallized conductive surface 58 of the second sidewall section 54 is mounted to the first metallized conductive surface 60 of the third sidewall section 56 by a third layer of conductive adhesive 64. Finally, the second metallized conductive surface 62 of the third sidewall section 56 is mounted to the top body portion 16 by the second layer of conductive adhesive 44.

To form this embodiment of the sidewall actuator 28, a first layer of piezoelectric material polarized in the indicated direction P is conductively mounted onto the main body portion 12. For example, the first layer of piezoelectric material may be constructed in the same manner that the intermediate body portion 14 was constructed except that the layer should have a reduced thickness. Next, a second layer of piezoelectric material polarized in the opposite direction is then conductively mounted onto the first layer of piezoelectric material. The second layer of piezoelectric material may be constructed in a manner identical to that used to construct the first layer and then rotated 180 degrees before mounting to provide the opposite direction of polarization. After a machining step identical to that previously described, the first and second layers of conductive adhesive 40, 44 should be connected to ground for each sidewall actuator 28 formed by the machining process and the third layer of conductive adhesive 58 should be connected to the voltage terminal 52 for each sidewall actuator 28 formed by the machining process.

Referring next to FIG. 12*c*, the third embodiment of the sidewall actuator 28 shall now be described in greater detail. Here, the sidewall actuator is again comprised of a pair of sidewall sections, but here, the first and second sidewall sections 66, 68, having first and second metallized conductive surfaces 70 and 72, 74 and 76, respectively, are both formed of an active material. Here the first layer of conductive adhesive 40 conductively mounts the first metallized conductive surface 34 of the main body portion 12 to the first metallized conductive surface 70 of the first sidewall section 66, a fourth layer of conductive adhesive 78 conductively mounts the second metallized conductive surface 72 of the first sidewall section 66 and the first metallized conductive surface 74 of the second sidewall section 68, and the second layer of conductive adhesive 44 conductively mounts the second metallized conductive surface 76 of the second sidewall section 68 and the metallized conductive surface 42 of the top body portion 16.

To form this embodiment of the sidewall actuator 28, a first layer of piezoelectric material polarized in the indicated direction P is conductively mounted onto the main body portion 12. For example, the first layer of piezoelectric material may be constructed in the same manner that the intermediate body portion 14 was constructed. Next, a second layer of piezoelectric material polarized in the opposite direction is then conductively mounted onto the first layer of piezoelectric material. The second layer of piezoelectric material may be identically constructed in the manner by which the first layer was constructed and then rotated 180 degrees before mounting to provide the opposite direction of polarization. In this embodiment, however, the machining step differs in that the groove formed thereby should not extend into the main body portion 12. Rather, the machining should be stopped after the metallized conductive surface 34 has been removed. Finally, the first and second layers of conductive adhesive 40 and 44 should be connected to ground for each sidewall 28 formed by the machining process and the third layer of conductive adhesive 78 should be connected to the voltage terminal 52 for each sidewall 28 formed by the machining process.

Referring next to FIG. 12*d*, the fourth embodiment of the sidewall actuator 28 shall now be described in greater detail. Here, the sidewall actuator 28 is comprised of a first sidewall section 30 formed from an inactive material and second, third, and fourth sidewall sections 80, 82 and 84 formed from an active material. Each active sidewall section 80, 82 and 84 has first and second metallized conductive surfaces 86 and 88, 90 and 92, and 94 and 96, respectively. In this embodiment, the first layer of conductive adhesive layer 40 conductively mounts the metallized conductive surfaces 34 and 86, a third conductive adhesive layer 98 conductively mounts metallized conductive surfaces 88 and 90, a fourth conductive adhesive layer 100 conductively mounts metallized conductive surfaces 92 and 94, and the second conductive adhesive layer 44 conductively mounts metallized conductive surfaces 96 and 42.

To form this embodiment of the sidewall actuator 28, a first layer of piezoelectric material polarized in the indicated direction P is conductively mounted onto the main body portion 12. For example, the first layer of piezoelectric material may be constructed in the same manner that the intermediate body portion 14 was constructed. Next, a second layer of piezoelectric material polarized in the opposite direction is then conductively mounted onto the first layer of piezoelectric material. The second layer of piezoelectric material may be identically constructed in the manner by which the first layer was constructed and then rotated 180 degrees before mounting to provide the opposite direction of polarization. Finally, a third layer of piezoelectric material of identical construction and direction of polarization as the first layer of piezoelectric material is then conductively mounted onto the second layer of piezoelectric material. After a machining step identical to that previously described with respect to FIGS. 12*a* and 12*b*, the first and fourth layers of conductive adhesive 40, 100 should be connected to the voltage terminal 52 for each sidewall actuator 28 formed by the machining process and the second and third layers of conductive adhesive 44, 98 should be connected to ground for each sidewall actuator 28 formed by the machining process.

Referring next to FIG. 12*e*, the fifth embodiment of the sidewall actuator 28 shall now be described in greater detail. Here, the sidewall actuator 28 is comprised of first, second, third, fourth, fifth, and sixth sidewall sections 104, 106, 108, 110, 112, and 114, each formed of an active material and each having first and second metallized conductive surfaces 116 and 118, 120 and 124, 126 and 128, 130 and 132, 134 and 136, 138 and 140, respectively attached thereto. The first conductive adhesive layer 40 conductively mounts metallized conductive surfaces 34 and 116, a third conductive adhesive layer 142 conductively mounts metallized conductive surfaces layers 118 and 120, a fourth conductive adhesive layer 144 conductively mounts metallized conductive surfaces 124 and 126, a fifth conductive adhesive layer 146 conductively mounts metallized conductive surfaces 128 and 130, a sixth conductive adhesive layer 148 conductively mounts metallized conductive surfaces 132 and 134, a seventh conductive adhesive layer 150 conductively mounts layers 136 and 138, and the second conductive adhesive layer 44 conductively mounts the metallized conductive surfaces 140 and 42.

To form this embodiment of the sidewall actuator 28, a first layer of piezoelectric material polarized in the indicated direction P is conductively mounted onto the main body portion 12. For example, the first layer of piezoelectric material may be constructed in the same manner that the intermediate body portion 14 was constructed but with a proportionately reduced thickness. Next, a second layer of piezoelectric material polarized in the opposite direction is then conductively mounted onto the first layer of piezoelectric material. The second layer of piezoelectric material may be identically constructed in the manner by which the first layer was constructed and then rotated 180 degrees before mounting to provide the opposite direction of polarization Third, fourth, fifth, and sixth layers of piezoelectric material are then identically constructed, rotated 180 degrees with respect to the preceding layer and the conductively mounted thereto. In this embodiment, the machining step is similar to that described with respect to FIG. 10*c* in that the groove formed thereby should not extend into the main body portion 12. Rather, the machining should be stopped after the metallized conductive surface 34 has been removed. Then, the third, fifth and seventh layers of conductive adhesive 142, 146 and 150 should be connected to the voltage terminal 52 for each sidewall 28 formed by the machining process and the first, second, fourth and sixth layers of conductive adhesive 40, 44, 144 and 148 should be connected to ground for each sidewall 28 formed by the machining process.

Figure 13:
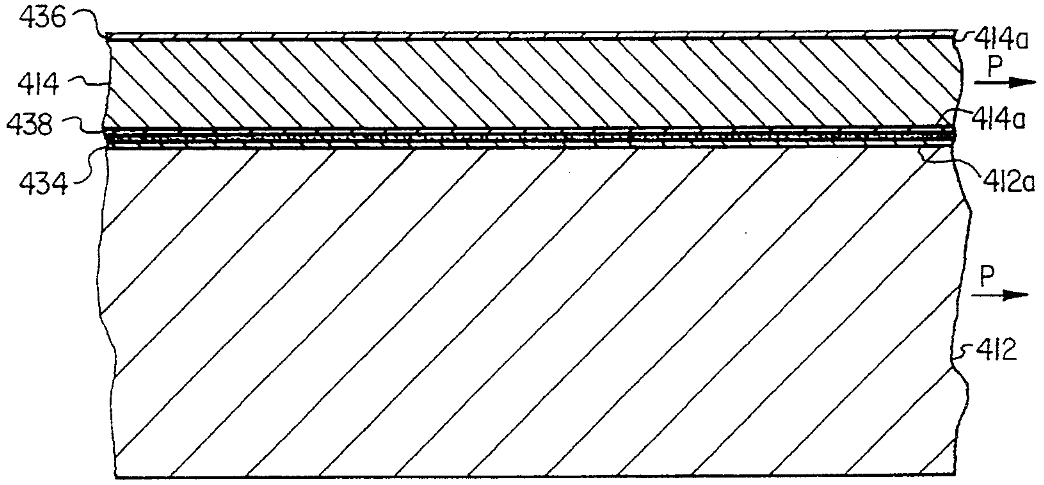
FIG. 13 is a partial front end elevational view of a polarized and metallized bottom block of piezoelectric material and a polarized and metallized thin block of piezoelectric material such as that illustrated in FIG. 6 after mating and bonding.

Referring next to FIG. 13, yet another embodiment of the invention may now be seen. Here, another intermediate body portion 414 constructed identically to the intermediate body portion 14 of FIG. 6 mated and bonded to a main body portion 412 may now be seen As before, the intermediate body portion 414 is constructed of piezoelectric material polarized in direction P and has metallized conductive surfaces 436, 438 provided on surfaces 414*b* , 414*a*, respectively. In this embodiment of the invention, however, the main body portion 412 is also formed of a piezoelectric material polarized in direction P. The main body portion 412 may be formed by compressing powdered piezoelectric material into a generally rectangular shape, firing the compressed piezoelectric material, smoothing the surfaces of the resultant block of piezoelectric material, polarizing the block of piezoelectric material in direction P and metallizing surface 412*a* by depositing a layer of conductive material 434 thereon. The intermediate body portion 414 and the main body portion 412 are bonded together by a layer of conductive adhesive 440 to conductively mount the metallized conductive surface 434 of the main body portion 412 and the metallized conductive surface 438 of the intermediate body portion 414 together. Alternately, bonding between the metallized conductive surface 434 of the main body portion 412 and the metallized conductive surface 438 of the intermediate body portion 414 may be achieved by soldering the metallized conductive surfaces 434, 438 to each other. It is further contemplated that, in accordance with one aspect of the invention, one or both of the metallized conductive surfaces 434 and/or 438 may be eliminated while maintaining satisfactory operation of the invention.

Figure 14:
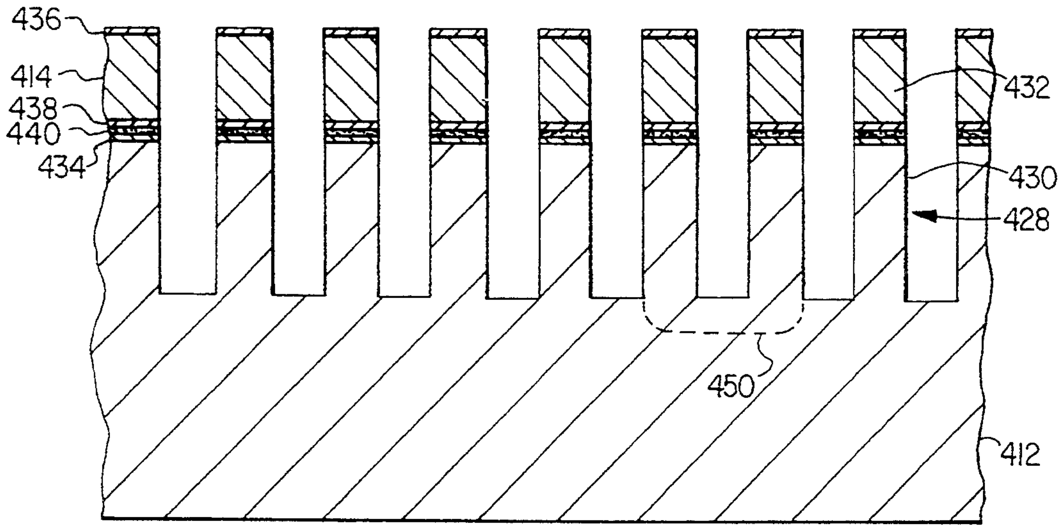
FIG. 14 is a partial front end elevational view of the mated and bonded blocks of piezoelectric material of FIG. 13 after a machining step.

After a sufficient length of time to allow the layer of conductive adhesive 440 to cure, a machining process is then commenced to form a channel array for the ink jet printhead. As may be seen in FIG. 14, a series of axially extending, substantially parallel channels 418 are formed by machining grooves which extend through the intermediate body portion 414 and the main body portion 412. Preferably, the machining process should be performed such that each channel 418 formed thereby should extend downwardly such that the metallized conductive surface 436, the intermediate body portion 414 of polarized piezoelectric material, the metallized conductive surface 438, the layer of conductive adhesive 440, the metallized conductive surface 434 and a portion of the main body portion 412 of polarized piezoelectric material are removed. In this manner, the channels 418 which comprise the channel array for the ink jet printhead and sidewall actuators 428, each having a first, sidewall actuator section 430 and a second sidewall actuator section 432, which define the sides of the channels 418 are formed. As to be more fully described below, by forming the parallel channel array in the manner herein described, a generally U-shaped sidewall actuator 450 (illustrated in phantom in FIG. 14) which comprises the first sidewall actuator sections 430 on opposite sides of a channel 418 and a part of the main body portion 412 which interconnects the first sidewall actuator sections 430 on opposite sides of the channel 418 is provided for each of the channels 418.

Figure 15:
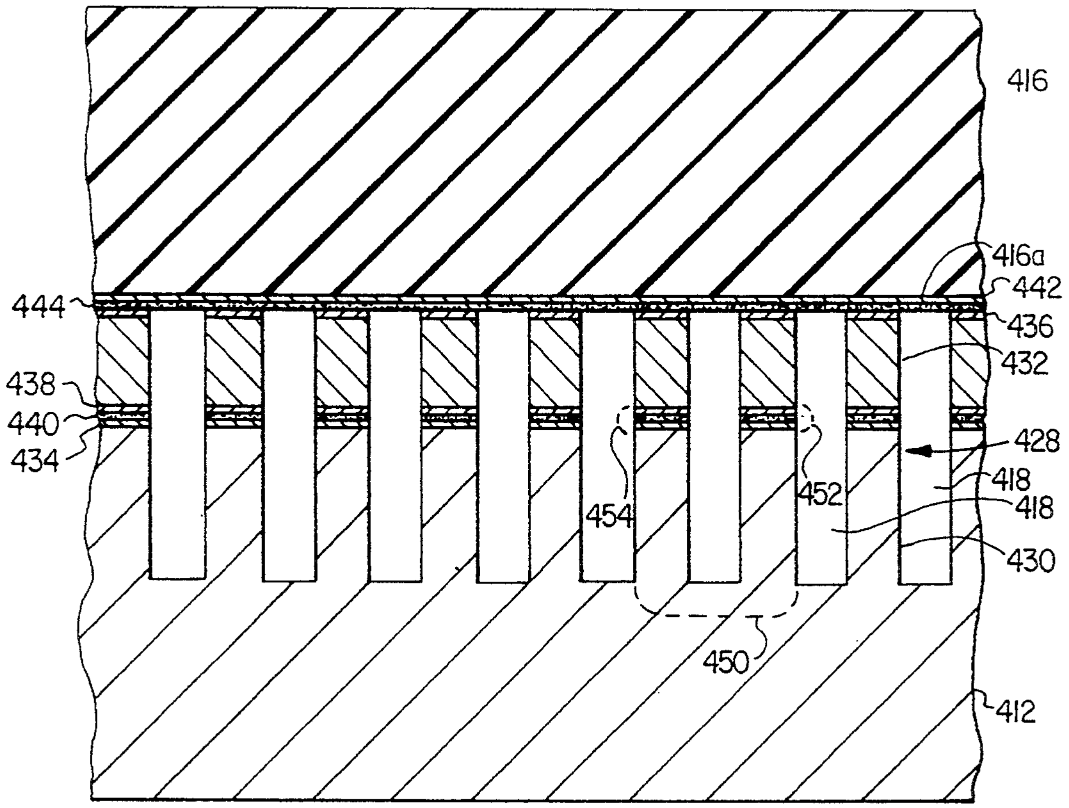
FIG. 15 is a partial front end elevational view of a fully assembled high density parallel channel array for an ink jet printhead constructed by mating a block of unpolarized, metallized piezoelectric material such as that illustrated in FIG. 7 to the machined block of piezoelectric material illustrated in FIG. 14.

Referring next to FIG. 15, the, now fully assembled, channel array for the ink jet printhead may be seen. The channel array for the ink jet printhead is formed by conductively mounting a third block 416 of unpolarized piezoelectric material, or other inactive material, having a single layer of metallized conductive surface 442 formed on the bottom surface 416*a* thereof to the metallized conductive surface 436 of the intermediate body portion 414. The third block 416, which hereafter shall be referred to as the top body portion 416 of the ink jet printhead, may be constructed in a manner similar to that previously described with respect to the top body portion 16. To complete assembly of the channel array for the ink jet printhead, the metallized conductive surface 442 of the top body portion 416 is conductively mounted to the metallized conductive surface 436 of the second sidewall section 432 by a second layer of conductive adhesive 444. Preferably, the layer of conductive adhesive 444 should be spread over the metallized conductive surface 42 and the top body portion 416 then be placed onto the metallized conductive surface 436. As before, it is contemplated that, in one embodiment of the invention, either one or both of the metallized conductive surfaces 436 or 442 may be eliminated while maintaining satisfactory operation of the high density ink jet printhead.

To electrically connect the parallel channel array illustrated in FIG. 15 such that a generally U-shaped actuator 450 is provided for each of said channels 418, a electrical contact 452, which, in alternate embodiments of the invention may be the metallized conductive surfaces 436 and 438 conductively mounted to each other by the conductive adhesive 440, the metallized conductive surfaces 436 and 438 soldered to each other, or a single layer of conductive adhesive which attaches surfaces 412*a* and 414*a* to each other, on one side of the channel 418 is connected to +1 V. voltage source (not shown). A second electrical contact 454 is then connected to a −1 V. voltage source. To complete the electrical connections for the parallel channel array, the layer of conductive adhesive 444 is connected to ground. In this manner, the channel 18 shall have a generally U-shaped actuator 450 having a 2 V. voltage drop between the contact 452 and the contact 454, a first sidewall actuator having a +1 V. voltage drop between the contact 452 and ground, and a second sidewall actuator having a −1 V voltage drop between the contact 454 and ground. Once constructed in this manner, when a +, −, +, − voltage pattern is applied to the contacts 405 to cause every other channel 418 to eject a droplet of ink upon the application of voltage, significantly greater compressive and/or expansive forces on the channel 418 are produced by the combination U-shaped actuator 450 and the pair of sidewall actuators 432 that border the channel 418 than that exerted on the channel 18 by the sidewall actuators 28.

Finally, while it should be clearly understood that the dimensions of a high density ink jet printhead having a parallel channel array with a U-shaped actuator for each channel may be readily varied without departing from the scope of the present invention, it is specifically contemplated that an ink jet printhead which embodies the present invention may be constructed to have the following dimensions:

| | |
|---|---|
| Orifice Diameter: | 40 μm |
| PZT length: | 15 μm |
| PZT height: | 120 μm |
| Channel height: | 356 μm |
| Channel width: | 91 μm |
| Sidewall width: | 81 μm |

Thus, there has been described and illustrated herein, various methods for manufacturing an high density, sidewall actuated, parallel channel array for an ink jet printhead. Each of the disclosed methods provide a relatively simple and inexpensive method of manufacturing the aforementioned ink jet printhead by providing for conductively mounting the desired active layers of material to be included in the sidewall actuators and then machining axially extending grooves through the layers of active material and, in several embodiments of the invention, through a portion of the underlying inactive material, thereby forming a plurality of ink-carrying channels as well as separating the layers of active material into a plurality of sidewall actuators for the newly formed channels. Furthermore, the layers of material which conductively mount adjacent sections of active material now divided into sidewall actuators are readily utilized as electrical contacts for placing selected voltage biases on the sidewall actuators by electrically connecting the ends of the electrical actuator to either a voltage source or to ground. However, those skilled in the art will recognize that many modifications and variations besides those specifically mentioned may be made in the techniques described herein without departing substantially from the concept of the present invention. Accordingly, it should be clearly understood that the form of the invention as described herein is exemplary only and is not intended as a limitation on the scope of the invention.

What is claimed is:

1. A method of manufacturing an ink jet printhead having an array of sidewall actuatable parallel channels, comprising the steps of:

providing a main body portion having a first surface, said main body portion formed from an active material;

providing an intermediate body portion having first and second surfaces;

conductively bonding said first surface of said intermediate body portion to said first surface of said main body portion;

forming a plurality of generally parallel channels which extend through said intermediate body portion and part of said main body portion, each of said plurality of parallel channels defined by a pair of sidewalls, each of said sidewalls having a lower part formed from said active material of said main body portion and an upper part formed from said intermediate body portion;

electrically connecting said pair of sidewalls defining each of said channels to provide a U-shaped actuator for said channel, said U-shaped actuator comprised of said electrically connected active lower part of said pair of sidewalls defining said channel.

2. A method of manufacturing an ink jet printhead according to claim 1 wherein said intermediate body portion is formed of an active material.

3. A method of manufacturing an ink jet printhead according to claim 2 wherein each of said upper parts of said sidewalls include first and second side surfaces and further comprising the steps of:

providing a top body portion having a first surface, said top body portion formed from an inactive material;

conductively bonding said first surface of said top body portion to said second side surfaces of said upper parts of said sidewalls; and electrically connecting said pair of sidewalls defining each of said channels to further provide a second and third actuator for said channels, said second and third actuators comprised of said electrically connected active upper parts of said pair of sidewalls defining said channels.

4. A method of manufacturing an ink jet printhead having an array of sidewall actuatable parallel channels, comprising the steps of:

providing a main body portion having a first surface, said main body portion formed from an active material;

providing an intermediate body portion having first and second surfaces, said first intermediate body portion formed from an active material;

conductively bonding said first surface of said intermediate body portion to said first surface of said main body portion;

forming a plurality of generally parallel grooves which extend from said second surface of said intermediate body portion and through part of said main body portion to produce a plurality of sidewalls, each having an upper side surface and first and second sections formed from said active material of said intermediate body portion and said main body portion, respectively;

providing a top body portion having a first surface, said top body portion formed from an inactive material;

conductively bonding said first surface of said top body portion to said upper side surface of each of said sidewalls to form a plurality of generally parallel channels, one for each groove, each of said channels being defined by a pair of said sidewalls and longitudinally extending in a first direction;

electrically connecting said conductive bond between said first surface of said intermediate body portion and said first surface of said main body portion to a controller configured to selectively apply a voltage having a first polarity for said first sidewall of each of said plurality of parallel channels;

electrically connecting said conductive bond between said first surface of said intermediate body portion and said first surface of said main body portion to a voltage source having a second polarity, opposite to said first polarity, for said second sidewall of each of said plurality of parallel channels; and electrically connecting said conductive bond between said first surface of said top body portion and said second surface of said intermediate body portion and ground for said first and second sidewalls for each of said plurality of parallel channels.

5. A method of manufacturing an ink jet printhead according to claim 4 wherein said intermediate and main body portions are formed from a piezoelectric material polarized in a second direction generally parallel to said first surface of said main body portion and generally perpendicular to said first direction.

6. A method of manufacturing an ink jet printhead according to claim 4 wherein said intermediate body portion further comprises first and second end walls and wherein the step of forming a plurality of generally parallel grooves further comprises the steps of:

forming a plurality of generally parallel grooves such that each of said grooves extends from said first end wall of said intermediate body portion to said second end wall of said intermediate body portion; and blocking each of said generally parallel grooves at said second end wall of said intermediate body portion.

7. A method of manufacturing an ink jet printhead according to claim 4 wherein the step of forming a plurality of generally parallel grooves further comprises the step of machining a plurality of generally parallel grooves which extend from said second surface of said intermediate body portion and through part off said main body portion.

8. A method of manufacturing an ink jet printhead having an array of sidewall actuatable parallel channels, comprising the steps of:

providing a main body portion having an upper side surface and a layer of conductive material formed on said upper side surface, said main body portion formed from an inactive material;

providing a first intermediate body portion having upper and lower side surfaces, a front wall and a back wall, said first intermediate body portion formed from an active material and shorter in length than said main body portion;

providing a second intermediate body portion having upper and lower side surfaces, said second intermediate body portion formed from said active material and shorter in length than said main body portion;

providing a third intermediate body portion having upper and lower side surfaces, said third intermediate body portion formed from said active material and shorter in length than said main body portion;

conductively bonding said lower side surface of said first intermediate body portion to said layer of conductive material formed on said upper side surface of said main body portion;

conductively bonding said lower side surface of said second intermediate body portion to said upper side surface of said first intermediate body portion;

conductively bonding said lower side surface of said third intermediate body portion to said upper side surface of said second intermediate body portion;

forming a plurality of generally parallel grooves which extend from said upper side surface of said third intermediate body portion and through said conductive layer formed on said upper slide surface of said main body portion to produce a plurality of generally parallel, sidewall actuators which longitudinally extend between said front and back walls, each of said sidewall actuators having first, second and third sections formed from said active material of said first, second and third intermediate body portions, respectively, a first conductive strip formed from said layer of conductive material formed on said upper side surface of said main body portion, and an upper side surface, said first conductive strip extending along said upper side surface of said main body portion beyond said back wall of said first intermediate body portion;

providing a top body portion having a lower side surface, said top body portion formed from an inactive material;

conductively bonding said lower side surface of said top body portion to said upper side surface of each of said sidewall actuators to form a plurality of channels, one for each of said grooves;

electrically connecting said conductive strip for each of said sidewall actuators, said conductive bond between said upper side surface of said second intermediate body portion and said lower side surface of said third intermediate body portion to a controller configured to selectively apply voltage to each of said plurality of sidewall actuators; and electrically connecting said conductive bond between said upper side surface of said first intermediate body portion and said lower side surface of said second intermediate body portion and said conductive bond between said lower side surface of said top body portion and said upper side surface of said third intermediate body portion to ground.

9. A method of manufacturing an ink jet printhead according to claim 8 wherein the step of forming a plurality of generally parallel grooves which extend from said upper side surface of said second intermediate body portion and through said conductive layer formed on said upper side surface of said main body portion further comprises the step of forming said plurality of generally parallel grooves to extend through a portion of said main body portion, thereby producing a plurality of generally parallel sidewall actuators having a fourth section formed from said inactive material.

10. A method of manufacturing an ink jet printhead according to claim 9 wherein said channels are formed to extend through said main body portion a sufficient distance such that said fourth sidewall section is longer than said first, second and third sidewall sections.

11. A method of manufacturing an ink jet printhead having an array of sidewall actuatable parallel channels, comprising the steps of:

providing a main body portion having an upper side surface and a layer of conductive material formed on said upper side surface, said main body portion formed from an inactive material;

providing a first intermediate body portion having upper and lower side surfaces, a front wall and a back wall, said first intermediate body portion formed from an active material and shorter in length than said main body portion;

providing a second intermediate body portion having upper and lower side surfaces, said second intermediate body portion formed from said active material and shorter in length than said main body portion;

providing a third intermediate body portion having upper and lower side surfaces, said third intermediate body portion formed from said active material and shorter in length than said main body portion;

providing a fourth intermediate body portion having upper and lower side surfaces, said fourth intermediate body portion formed from said active material and shorter in length than said main body portion;

providing a fifth intermediate body portion having upper and lower side surfaces, said fifth intermediate body portion formed from said active material and shorter in length than said main body portion;

providing a sixth intermediate body portion having upper and lower side surfaces, said sixth intermediate body portion formed from said active material and shorter in length than said main body portion;

conductively bonding said lower side surface of said first intermediate body portion to said layer of conductive material formed on said upper side surface of said main body portion;

conductively bonding said lower side surface of said second intermediate body portion to said upper side surface of said first intermediate body portion;

conductively bonding said lower side surface of said third intermediate body portion to said upper side surface of said second intermediate body portion;

conductively bonding said lower side surface of said fourth intermediate body portion to said upper side surface of said third intermediate body portion;

conductively bonding said lower side surface of said fifth intermediate body portion to said upper side surface of said fourth intermediate body portion;

conductively bonding said lower side surface of said sixth intermediate body portion to said upper side surface of said fifth intermediate body portion;

forming a plurality of generally parallel grooves which extend from said upper side surface of said sixth intermediate body portion and through said conductive layer formed on said upper side surface of said main body portion to produce a plurality of generally parallel, sidewall actuators which longitudinally extend between said front and back walls, each of said sidewall actuators having first, second, third, fourth, fifth and sixth sections formed from said active material of said first, second, third, fourth, fifth and sixth intermediate body portions, respectively, a first conductive strip formed from said layer of conductive material formed on said upper side surface of said main body portion, and an upper side surface, said first conductive strip extending along said upper side surface of said main body portion beyond said back wall of said intermediate body portion;

providing a top body portion having a lower side surface, said top body portion formed from an inactive material;

conductively bonding said lower side surface of said top body portion to said upper side surface of each of said sidewall actuators to form a plurality of channels, one for each of said grooves;

electrically connecting said conductive bond between said upper side surface of said first intermediate body portion and said lower side surface of said second intermediate body portion, said conductive bond between said upper side surface of said third intermediate body portion and said lower side surface of said fourth intermediate body portion, and said conductive bond between said upper side surface of said fifth intermediate body portion and said lower side surface of said sixth intermediate body portion to a controller configured to selectively apply voltage to each of said plurality of sidewall actuators; and electrically connecting said conductive strip, said conductive bond between said upper side surface of said second intermediate body portion and said lower side surface of said third intermediate body portion, said conductive bond between said upper side surface of said fourth intermediate body portion and said lower side surface of said fifth intermediate body portion and said conductive bond between said lower side surface of said top body portion and said upper side surface of said sixth intermediate body portion to ground.

12. A method of manufacturing an ink jet printhead according to claim 11 wherein said first, second, third, fourth, fifth and sixth intermediate body portions are of approximately equal height.

* * * * *